Jan. 25, 1938.   L. T. JONES ET AL   2,106,528
INSECT ELECTROCUTOR
Filed Aug. 7, 1935   2 Sheets-Sheet 1

INVENTOR
BY
ATTORNEY

Jan. 25, 1938.                L. T. JONES ET AL                 2,106,528
                                INSECT ELECTROCUTOR
                        Filed Aug. 7, 1935         2 Sheets-Sheet 2

INVENTOR
BY
ATTORNEY

Patented Jan. 25, 1938

2,106,528

UNITED STATES PATENT OFFICE 2,106,528

INSECT ELECTROCUTOR

Lloyd Theodore Jones and Joe Koebele Ellsworth, Berkeley, Calif.

Application August 7, 1935, Serial No. 35,143

5 Claims. (Cl. 43—112)

This invention relates to an insect electrocuting device wherein the insert is attracted by a light or an odor and so brought within the range of operation of electrified wires.

In the protection of field crops from insect pests it is found to be possible to sufficiently augment the tonnage and quality of the crop that the rancher is able to operate this insect electrocutor with profit to himself. This is accomplished through the large number of insects per watt and per dollar that are lured and electrocuted.

The vision of most insects is such that they respond more readily to certain colors of light than to other colors. There are but few insects which respond in equal numbers to all colors of light.

Since luring insects by light and electrocution of the insects thus lured is well known in the art the problem of making a device that can be economically successful is the problem of so constructing it that it is low in initial cost, perfect in its operation and so that it attracts and electrocutes the largest possible number of insects per watt of energy expended or per dollar of cost and maintenance.

Figure 1 shows a general view of the device, partly in section.

Figs. 2 and 2a disclose respectively an end view and side view of the first set of electrocuting wires.

The numbers used in designating the various parts apply equally well to any figure.

Figure 1:
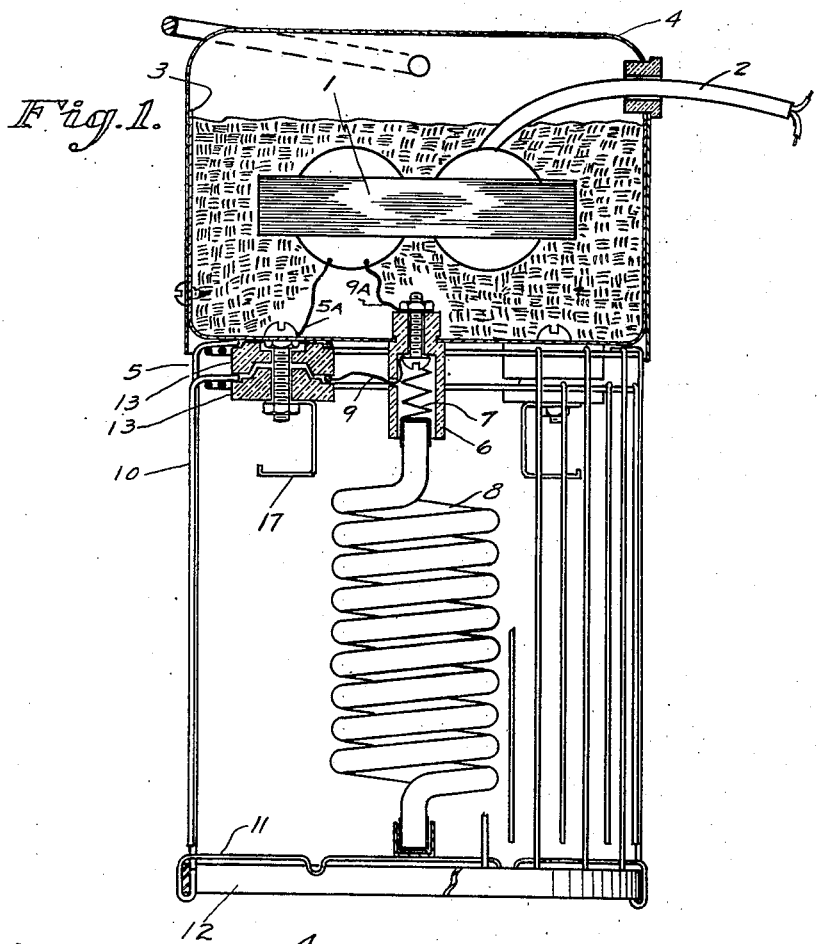

Referring particularly to Figure 1: A transformer 1 provided with a cord 2 for attachment to a suitable source of alternating current is embedded in a pitch-like compound in a container-cup 3 which thus forms the main portion of the transformer housing. This portion of the transformer housing is a cylindrical metal container-cup formed by the stamping process. The remaining portions of the device are mounted on this transformer housing as a base by fastening with screws, bolts or other suitable means.

The transformer housing is surmounted by a metal inverted close fitting or telescoping stamped cup or hood 4 of slightly larger diameter and which serves to carry the bail by which the device is suspended.

One terminal 5a of the high tension winding of the transformer is connected to the transformer housing and thus to one set 5 of the electrocuting wires which are in electrical contact with the transformer housing. The second high tension terminal 9a of the transformer is carried through the bottom of the transformer housing at its center, through the intermediary of an insulating bushing 6, and by means of the coil spring 7 makes contact with one electrode of a luminescent tube 8. This high tension lead divides and passes by means of the connecting wire 9 through a hole in the side of the insulating bushing to the second set of electrocuting wires 10. The lower electrode of the luminescent tube rests on a resilient cross member 11 which is carried by a band 12 to which the set of electrocuting wires 5 is welded.

The luminescent tube is in the form of a helix, having an electrode at each end. It is filled with a rare gas at reduced pressure as is common in the neon tube art. The color of the light which is emitted by the luminescent tube is a function of the gas with which the tube is filled and of the glass of which it is fabricated. The quantity of light is a function of the length of the tube, of the current at which it is operated and of the nature of the gas filling. The color used is that which is most attractive to the particular insect it is desired to entrap.

For use in controlling the grape leaf hopper in vineyards we use a luminescent tube formed of clear glass and containing a filling of one of the rare gases and mercury. The females are most attracted by this color. The males respond in greater numbers to the neon red. In one vineyard the red neon tube attracted thirteen times as many males as females while in the same vineyard the blue tube mentioned attracted but one seventh as many males as females.

In the artichoke fields we use a dark blue glass tube and fill it with one of the rare gases and mercury. This is found to be particularly attractive to the plume moth which infests those fields.

The electrocuting-wire system is formed by two sets of cylindrical electrocuting-wire cages, electrically and mechanically spaced by insulating posts 13 which in turn are held in place by bolts projecting through the bottom of the container-cup forming the transformer housing. The hood is fastened to the transformer housing by means of sheet metal screws.

Figure 2:
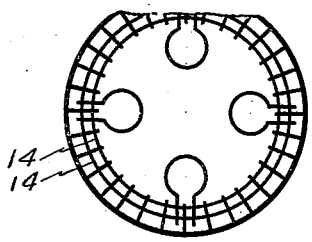
Figs. 2b and 2c show respectively in end elevation and side elevation the second set of electrocuting wires of the electrocuting wire system.
Figure 3:
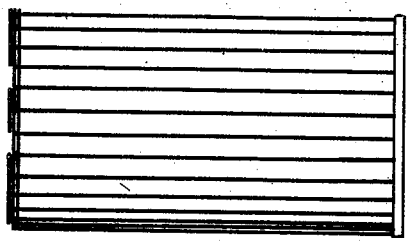
Figure 3 shows the electrical circuit used when the full voltage applied to the wires is also supplied to the luminescent tube lure.
Figure 3:
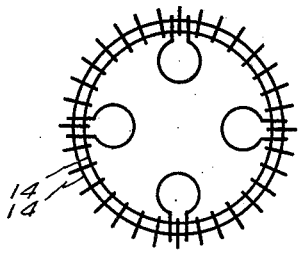
Figure 3:
Figure 3:
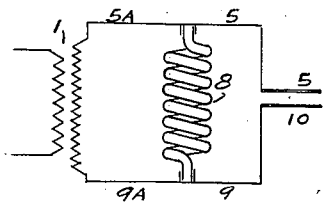

The set of electrocuting wires 5 which are held by the bolts in contact with the under side of the transformer housing are joined together at the top as indicated in Figures 2 and 2a and joined together at the bottom by a band or wire. The second set of electrocuting wires shown in Figures 2b and 2c are joined together at the top by wire rings 14 but the lower ends are left free. It is obvious that the entire joining of the wires to form the two integral portions shown in Figures 2 to 2c inclusive may be accomplished by spot welding. In assembling advantage is then taken of the fact that the diameter of the band is sufficient to permit the set of wires 10 to pass through. The resilient cross member is then placed in position and the luminescent tube inserted. As the insect flies toward the light it comes into contact with the wires which are so arranged that two adjacent wires are at different potentials by several thousand volts. The insect falls free and the absence of intricate construction at the lower band permits it to fall to the ground. Whether the cylindrical wire cages are of equal or unequal diameter it is advisable to leave the lower ends of the one set of wires unrestrained and at a sufficient distance from the band uniting the other set that no sparking occurs there.

When an insect strikes the wires it usually causes a spark to occur. If the device is in its upright position this spark or arc may travel upward and if so will be extinguished when it comes to the upper end of the set 10 of electrocuting wires, since they there form in effect a horn-gap with the other set of wires.

When entrapping insects such as the fly, since only some of them respond readily to light, it is desirable to place an odor as a lure within the cylinder or enclosure formed by the wire cages. A container holding the odor may be suspended from one or more wire lugs 17 attached to the mounting bolts. The odor container and the odor used do not form a part of this invention.

Since almost all insects are attracted by suitable odors and since the light is effective as a lure only during darkness or in darkened places it is often advisable to use both a light and an odor.

In catching insects such as the moth, *Ephestia*, infesting dried fruit warehouses it is advisable to so space the wires and to so regulate the voltage by means of the length and filling of the luminescent tube that the tiny wasp which is parasitic on the moth larvae may pass unharmed between the wires.

In catching larger insects we normally space the electrocuting wires farther apart and fill the luminescent tube at such a pressure that the voltage resulting at the wires is suitable.

Figure 5:
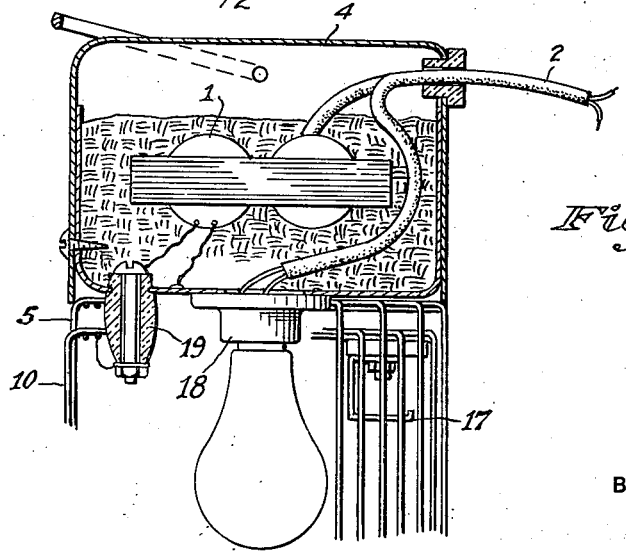
Figure 5 shows a partial view of the device when an incandescent lamp is used instead of a luminescent tube as the lure.

When it is desired to afford a normal source of light and to electrocute those insects which are attracted to such a light the device is altered to the form shown in Figure 5. The luminescent tube is there omitted and an incandescent lamp carried in a socket 18 is attached to the bottom of the transformer housing at its center and electrically operated in parallel with the transformer, the low tension leads being brought to the socket through the bottom of the transformer housing. The terminals of the high tension winding of the transformer are connected by utilizing the electrical contact with the transformer housing and by passing the second high tension lead through an insulating post 19 to the two sets of electrocuting wires 5 and 10.

Figure 4:
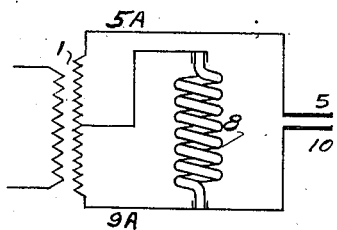
Figure 4 shows the circuit that is used when only a portion of the voltage applied to the electrocuting wires is applied to the luminescent tube.

When it is desired to use a very short luminescent tube to avoid having so great an intensity of light as to repel certain insects which nevertheless are attracted to that color at lesser intensity it is advantageous to use the circuit shown in Figure 4. Here the two terminals of the high tension winding are connected to the two sets of electrocuting wires by the intermediary of the transformer housing and an insulating bushing such as 19 shown in Figure 5. An intermediate tap from the high tension coil is then brought to the coil spring 7 as in Figure 1, the wire 9 being disconnected.

What we claim is:

1. An insect electrocuting device comprising a cylindrical housing, insulating posts projecting from the underside of said housing, a first electrocuting cage comprising a ring secured to said insulating posts, electrocuting wires secured at their upper ends to said ring in circumferentially spaced relation and depending downwardly, a second electrocuting cage comprising a ring secured to the underside of said housing, a circular band spaced downwardly from the housing beyond the lower ends of the electrocuting wires of the first cage, electrocuting wires secured at their opposite ends to said ring and band in circumferentially spaced relation and interposed between the electrocuting wires of the first cage and in circumferentially spaced relation relative thereto, the electrocuting wires of both cages being arranged in substantially the same peripheral plane about the axis of the housing, and a luminescent tube arranged centrally within said cages below said housing.

2. An insect electrocuting device comprising a cylindrical housing, insulating posts projecting from the underside of said housing, a first electrocuting cage comprising a ring secured to said insulating posts, electrocuting wires secured at their upper ends to said ring in circumferentially spaced relation and depending downwardly, a second electrocuting cage comprising a ring secured to the underside of said housing, a circular band spaced downwardly from the housing beyond the lower ends of the electrocuting wires of the first cage, electrocuting wires secured at their opposite ends to said ring and band in circumferentially spaced relation and interposed between the electrocuting wires of the first cage and in circumferentially spaced relation relative thereto, the electrocuting wires of both cages being arranged in substantially the same peripheral plane about the axis of the housing, a socket at the underside of said housing, a second socket in axial alignment therewith and yieldably supported by said band, a luminescent tube wound in the form of a helix with its electrodes at opposite ends arranged in alignment and adapted to be removably engaged with said sockets.

3. An insect electrocuting device comprising a cylindrical housing, insulating posts projecting from the underside of said housing, a first electrocuting cage comprising a ring secured to said insulating posts, electrocuting wires secured at their upper ends to said ring in circumferentially spaced relation and depending downwardly, a second electrocuting cage comprising a ring secured to the underside of said housing, a circular band spaced downwardly from the housing beyond the lower ends of the electrocuting wires of the first cage, electrocuting wires secured at their opposite ends to said ring and band in circumferentially spaced relation and interposed between the electrocuting wires of the first cage and in circumferentially spaced relation relative thereto, the electrocuting wires of both cages being arranged in substantially the same peripheral plane about the axis of the housing, and a luminescent tube arranged centrally within said cages below said housing, a high tension transformer disposed within the housing for connection with a source of electrical supply, the high tension terminals of said transformer being electrically connected respectively to the electrocuting wires of the two cages and to the electrodes of said luminescent tube whereby the latter will determine the resulting voltage of the wires.

4. An insect electrocuting device comprising a cylindrical housing, insulating posts projecting from the underside of said housing, a first electrocuting cage comprising a ring secured to said insulating posts, electrocuting wires secured at their upper ends to said ring in circumferentially spaced relation and depending downwardly, a second electrocuting cage comprising a ring secured to the underside of said housing, a circular band spaced downwardly from the housing beyond the lower ends of the electrocuting wires of the first cage, electrocuting wires secured at their opposite ends to said ring and band in circumferentially spaced relation and interposed between the electrocuting wires of the first cage and in circumferentially spaced relation relative thereto, the electrocuting wires of both cages being arranged in substantially the same peripheral plane about the axis of the housing, a socket at the underside of said housing, a second socket in axial alignment therewith and yieldably supported by said band, a luminescent tube wound in the form of a helix with its electrodes at opposite ends arranged in alignment and adapted to be removably engaged with said sockets, a high tension transformer disposed in said housing, a protecting compound in the housing enclosing said transformer, the high tension terminals of said transformer being electrically connected respectively to the electrocuting wires of said cages and through said sockets to the electrodes of said luminescent tube whereby the latter will determine the resulting voltage of the wires.

5. An insect electrocuting device comprising two concentrically arranged cages, each formed with circumferentially spaced and vertically disposed electrocuting wires, the electrocuting wires being arranged relatively spaced and alternately arranged, a housing from which said cages are suspended, a high tension transformer disposed in said housing and capable of connection to a source of electrical supply, a luminescent tube arranged centrally within said cages, the high tension terminals of said transformer being connected respectively to the two sets of electrocuting wires of said cages and to the two electrodes of the luminescent tube whereby the latter will determine the resulting voltage of the wires.

LLOYD THEODORE JONES.
JOE KOEBELE ELLSWORTH.